United States Patent [19]
Siebelink, Jr. et al.

[11] Patent Number: 5,702,779
[45] Date of Patent: Dec. 30, 1997

[54] PLASTIC PANEL ASSEMBLY FOR USE IN A VEHICLE

[75] Inventors: Robert John Siebelink, Jr., Ann Arbor; Lloyd G. Racine, ShelbyTownship, both of Mich.

[73] Assignee: Webasto Sunroofs Inc, Rochester Hills, Mich.

[21] Appl. No.: 503,013

[22] Filed: Jul. 17, 1995

[51] Int. Cl.$^6$ ............................................. B60J 7/043
[52] U.S. Cl. ....................... 428/14; 296/191; 296/216
[58] Field of Search ......................... 428/14; 296/191, 296/216, 222, 224

[56] References Cited

U.S. PATENT DOCUMENTS

| | | | |
|---|---|---|---|
| 3,274,721 | 9/1966 | Dreyer | 428/14 X |
| 3,970,343 | 7/1976 | Horn | 296/222 |
| 4,154,474 | 5/1979 | Hough et al. | 296/218 |
| 4,860,511 | 8/1989 | Weisner et al. | 52/200 |
| 5,046,779 | 9/1991 | Ichimose et al. | 296/216 |
| 5,295,342 | 3/1994 | Roche et al. | 428/14 X |

*Primary Examiner*—Henry F. Epstein
*Attorney, Agent, or Firm*—Cushman, Darby & Cushman IP Group of Pillsbury Madison & Sutro LLP

[57] ABSTRACT

A plastic panel assembly for use in a vehicle is provided including a frame structure defining a central opening therein disposed in a plane and a plastic panel structure disposed with respect to the frame structure so that a marginal peripheral portion thereof extending generally in the direction of extent of the plane is coextensive with a marginal peripheral portion of the frame structure and a central portion thereof extends in covering relation with the central opening. The frame structure has a coefficient of thermal expansion less than that of the plastic panel structure. A series of at least three pin and slot connections extend operatively between the coextensive peripheral portions of the structures and are disposed in spaced relation therealong for retaining the coextensive peripheral portions of the structures together. Each pin and slot connection includes a slot formed in one of the structures and a pin secured to another one of the structures and extends transversely through the slot formed in the one structure. Each slot has a longitudinal axis extending in a direction toward a common point. Each pin and slot connection is constructed and arranged to prevent relative movement of the pin within the slot along the plane in one direction within which the pin and slot connection is disposed while allowing relative movement of the pin within the slot along the plane generally in directions away from and toward the common point.

11 Claims, 5 Drawing Sheets

PLASTIC PANEL ASSEMBLY FOR USE IN A VEHICLE

This invention relates to plastic panel assemblies and, more particularly, to plastic panel assemblies for use in vehicles.

With the development of new plastic materials, it is now possible to replace conventional glass panels used in vehicles with light-weight, transparent plastic panel assemblies. For example, fixed vehicle windows may be replaced with plastic panel assemblies. Further, a plastic roof panel may be employed in a sunroof assembly mounted for movement between a closed position with respect to a roof opening and a fully opened position, or a venting position where a rear end of the panel is tilted upwardly with respect to the vehicle roof. Alternatively, the sunroof assembly may be of the type whereby the plastic roof panel may be removed completely from the opening and moved to storage.

The use of plastic panels has been limited due to the thermal expansion properties of plastic material. Plastic panels, when used in vehicles, are exposed to a temperature range generally between −40 to 104 degrees Celsius. Thus, thermal expansion and contraction of the plastic panel must be accounted for when mounted to a sheet metal frame or frame of other material having a coefficient of thermal expansion substantially less than that of the plastic panel. To compensate for expansion and contraction of the plastic panel, the panel must be mounted stably, yet be capable of moving relative to the frame.

Accordingly, a need exists to provide a plastic panel assembly wherein the plastic panel of the assembly is mounted to a frame having a coefficient of thermal expansion substantially less than that of the plastic panel, such that the plastic panel may move relative to the frame in at least one direction upon thermal expansion of the plastic panel while the panel is connected stably to the frame.

An object of the present invention is to fulfill the need expressed above. In accordance with the principles of the present invention, this objective is accomplished by providing a plastic panel assembly for use in a vehicle including a frame structure defining a central opening therein disposed in a plane and a plastic panel structure disposed with respect to the frame structure so that a marginal peripheral portion thereof extending generally in the direction of extent of the plane is coextensive with a marginal peripheral portion of the frame structure and a central portion thereof extends in covering relation with the central opening. The frame structure has a coefficient of thermal expansion less than that of the plastic panel. A series of at least three pin and slot connections extend operatively between the coextensive peripheral portions of the structures and are disposed in spaced relation therealong for retaining the coextensive peripheral portions of the structures together. Each pin and slot connection includes a slot formed in one of the structures and a pin secured to another one of the structures and extends transversely through the slot formed in the one structure. Each slot has a longitudinal axis extending in a direction toward a common point. Each pin and slot connection is constructed and arranged to prevent relative movement of the pin within the slot along the plane in one direction within which the pin and slot connection is disposed while allowing relative movement of the pin within the slot along the plane generally in directions away from and toward the common point. The series of pin and slot connections is constructed and arranged so as to enable the plastic panel structure to expand and contract with respect to the central opening in response to changes in temperature within a range of operating temperatures while providing a stable connection in any direction along the plane between the coextensive peripheral portions of the structures throughout the range of temperature changes.

In accordance with another aspect of the invention, a method of compensating for thermal expansion and contraction of a plastic panel structure mounted to a frame structure is provided. The frame structure has a coefficient of thermal expansion less than that of the plastic panel and defines a central opening therein disposed in a plane. The plastic panel structure is disposed with respect to the frame structure so that a marginal peripheral portion thereof extending generally in the direction of extent of the plane is coextensive with a marginal peripheral portion of the frame structure and a central portion thereof extends in covering relation with the central opening. The method includes providing a series of at least three pin and slot connections extending operatively between the coextensive peripheral portions of the structures and disposed in spaced relation therealong for retaining the coextensive peripheral portions of the structures together. Each pin and slot connection includes a slot formed in one of the structures and a pin secured to another one of the structures and extending transversely through the slot formed in the one structure. Each slot has a longitudinal axis extending in a direction toward a common point. Relative movement of the pin within the slot is prevented along the plane in one direction within which the pin and slot connection is disposed while relative movement of the pin within the slot along the plane is permitted generally in directions away from and toward the common point. The plastic panel structure is able to expand and contract with respect to the central opening in response to changes in temperature within a range of operating temperatures while a stable connection in any direction is provided along the plane between the coextensive peripheral portions of the. structures throughout the range of temperature changes.

These and other objects of the present invention will become more apparent during the course of the following detailed description and appended claims. The invention may thus be understood with reference to the accompanying drawings wherein an illustrative embodiment is shown.

Figure 1:
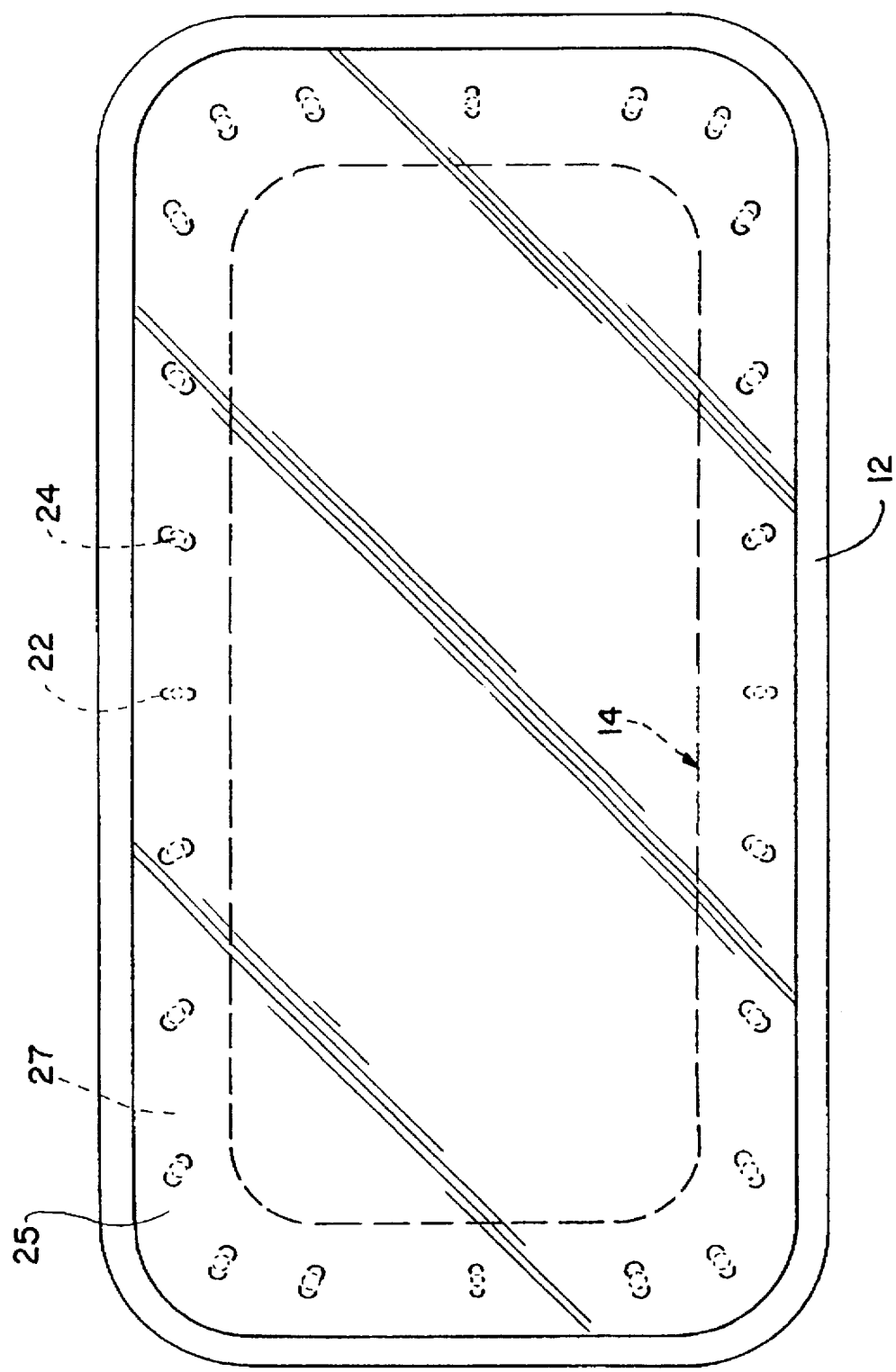
FIG. 1 is a plan view of a plastic panel assembly provided in accordance with the principles of the present invention.

Referring now more particularly to the drawings, there is shown in FIGS. 1–4 a plastic panel assembly, generally indicated at 10, which includes a plastic panel 12, preferably of polycarbonate material, and a frame, generally indicated at 14, embodying the principles of the present invention. The frame 14 is of a material having a coefficient of thermal expansion less than that of the plastic panel 12. In the illustrated embodiment, the frame 14 is a sheet metal frame; however, other materials having a lower thermal expansion coefficient than that of the plastic panel 12 and having sufficient rigidity are within the contemplation of the invention. For example, a glass-filled plastic frame could be used.

In the illustrated embodiment of FIGS. 3–5 and 7, the plastic panel assembly 10 is shown mounted in an opening 16 of a vehicle roof 18 and is employed as a movable sunroof panel.

Figure 2:
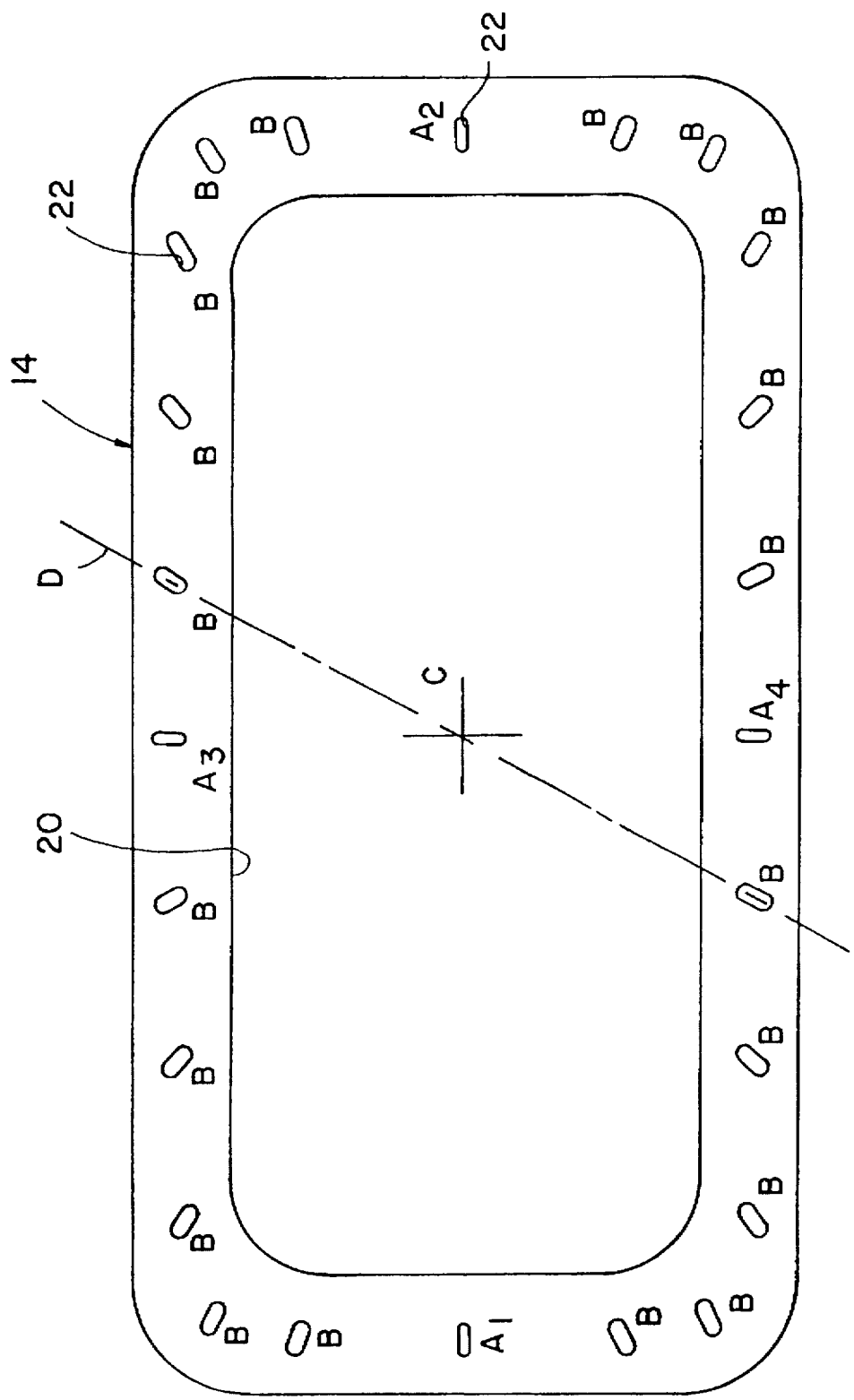
FIG. 2 is a plan view of a sheet metal frame showing the orientation of mounting slots for receiving pin members of a plastic panel.
Figure 3:
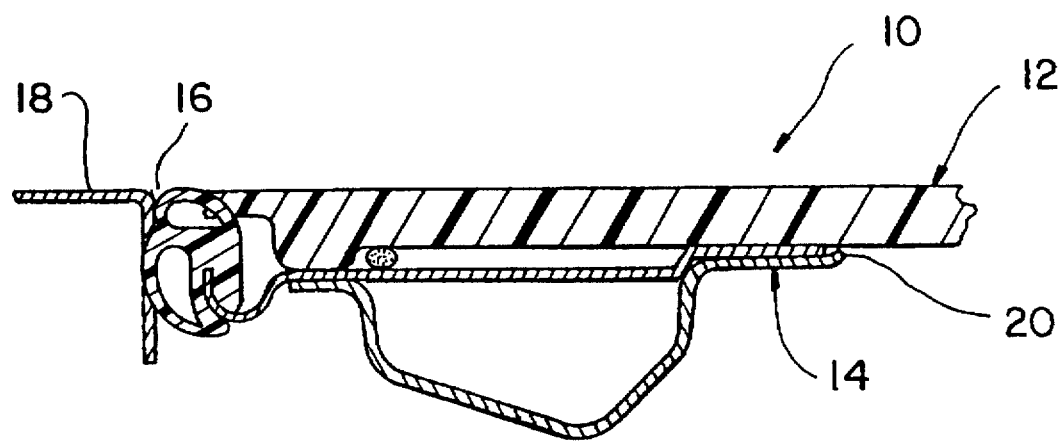
FIG. 3 is a partial, cross-sectional view of the plastic panel assembly provided in accordance with the principles of the present invention, shown mounted in an opening of a vehicle roof defining a sunroof panel.

As shown in FIG. 2, the sheet-metal frame 14 is of generally rectangular configuration having a central opening 20 therein disposed in a plane. The frame 14 includes a plurality of spaced openings or slots 22 therein which are used for mounting the plastic panel 12 to the frame 14 so that the panel 12 covers the central opening 20. In the illustrated embodiment, the plastic panel 12 is an amorphous material. It should be noted that not all plastics are amorphous. However, certain plastics formed by particular processes can be made amorphous. Since thermal expansion occurs generally evenly in all directions in an amorphous material, in the illustrated embodiment, the slots 22 are arranged radially from the center point C of the frame 14 or opening 20. Thus, the longitudinal axis D of each slot 22 passes generally through the center point C. In the illustrated embodiment, the center point C is selected as the common point to which the slots 22 are directed so as to ensure uniform expansion of the plastic material. It is noted that the slots 22 are directed to a common point, but that point need not be the center point of the assembly 10.

Figure 4:
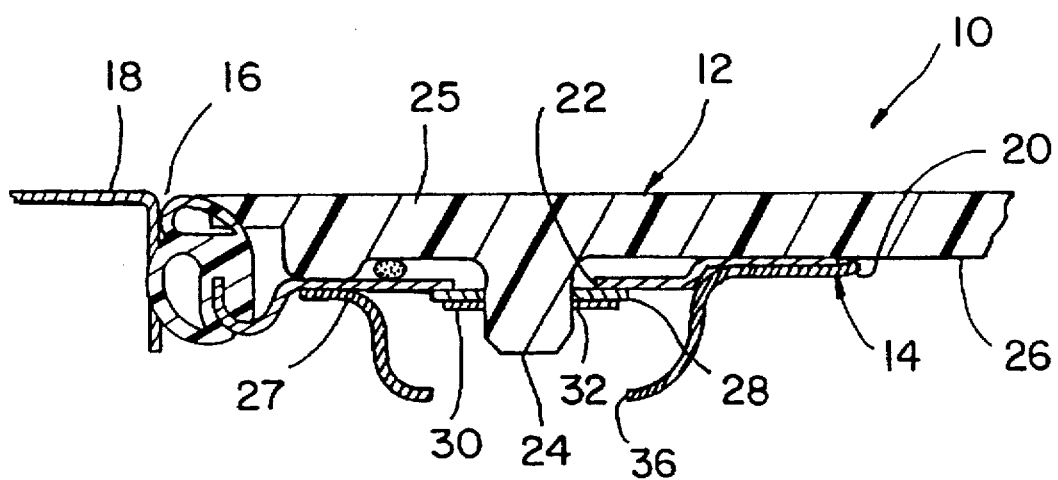
FIG. 4 is a partial, cross-sectional view of the assembly of FIG. 3 at a pin location.
Figure 5:
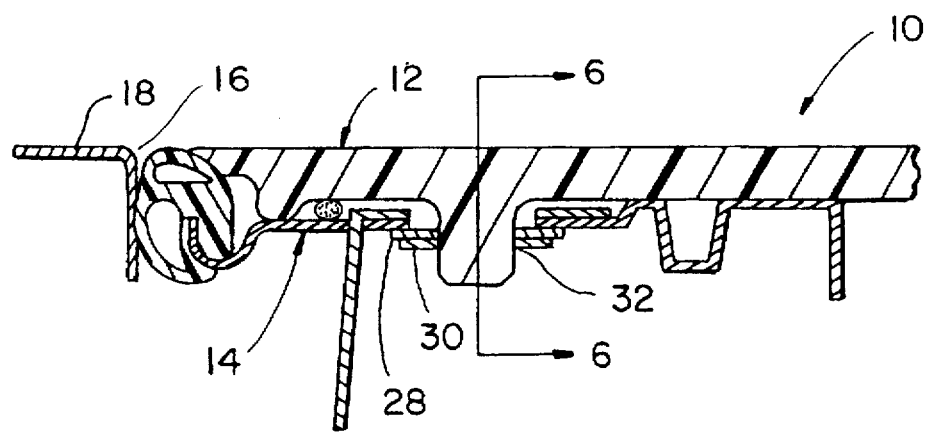
FIG. 5 is a sectional view of a side of the plastic panel assembly of FIG. 3.
Figure 6:
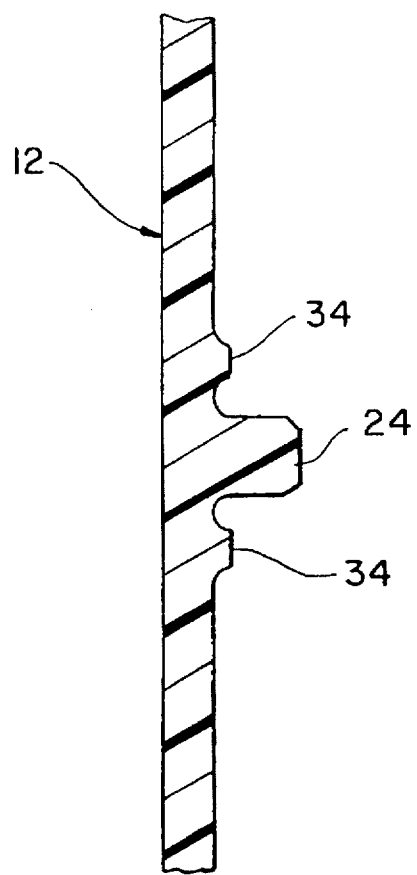
FIG. 6 is a sectional view of the plastic panel of the assembly taken along the line 6—6 of FIG. 5.

All of the slots 22 are constructed and arranged to receive a generally cylindrical pin member or pin 24, extending from a bottom surface 26 of the plastic panel 12, as best shown in FIGS. 4–6. All cylindrical pins 24 have diameters of equal size.

In the illustrated embodiment, the pins 24 are made integral with the plastic panel 12. However, it can be appreciated that the pins 24 may be formed as a separate part which may be coupled to the bottom surface 26 of the plastic panel 12. The plastic panel 12 is also of generally rectangular configuration and the pins 24 are located in a peripheral portion thereof so that the plastic panel 12 may be secured to the frame 14, covering central opening 20. Thus, in the illustrated embodiment, a marginal peripheral portion 25 of the panel 12 extends generally in the extent of the plane and is coextensive with a marginal peripheral portion 27 of the frame 14.

The plastic panel 12 is fixed from movement in the X-direction (FIG. 2) by slots $A_3$ and $A_4$, and is fixed from Y-direction movement by slots $A_1$ and $A_2$. Thus, slots $A_1$ through $A_4$ locate the plastic panel 12 with respect to the frame 14. It can be appreciated that a minimum of three "A" slots are required to properly locate and secure the plastic panel 12 with respect to the frame 14. In the illustrated embodiment, however, four slots are provided.

Slots B as shown in FIG. 2 are clearance slots for securing the peripheries of the panel 12 and frame 14 together thereby providing stability of the assembly 10 in the Z-direction, as will become more apparent below. In the illustrated embodiment, the slots $A_1$ through $A_4$ have a width less than the width of the clearance slots B, ensuring that the panel 12 is fixed in the X and Y directions by the pins 24 as noted above.

With reference to FIGS. 1, 4 and 5, mounting of the plastic panel 12 to the sheet metal frame 14 will be appreciated. As shown, a plurality of pin and slot connections extend operatively between the coextensive peripheral portions 25, 27 of the panel 12 and frame 14 and are disposed in spaced relation therealong for retaining the coextensive peripheral portions together. As shown, each pin and slot connection includes a pin 24 extending transversely through a slot 22 and retained by fastening structure. The fastening structure is in the form of a washer 28 and fastener 30 and retains the coextensive peripheral portions of the panel 12 and frame 14 together. In retaining the panel 12 to the frame 14, after inserting the pins 24 into the slots 22 of the frame 14, a slip washer 28, having a bore therethrough, is disposed over each pin 24. Next, the fastener 30 of generally disc-shape and having barbs 32 extending from a surface thereof is used to secure the plastic panel 12 to the frame 14. The fasteners 30 have a bore therethrough sized to receive an associated pin 24. Fastener 30 is easy to assemble and provides a securing function without adding a compressive force component upon fastening. This feature aids in the sliding of the plastic panel 12 relative to the sheet metal frame 14, as will become apparent below. The washer 28, preferably of TEFLON®, reduces friction between the plastic panel 12 and the sheet metal frame 14. Thus, as shown in FIGS. 4 and 5, the barbs 32 of the fastener 30 engage the peripheral surface of the pin 24 so as to prevent the washer 28 and fastener 30 from disengaging from the pin 24. Further, with the fastener 30 firmly in place, the washer 28 is sandwiched between the frame 14 and the fastener 30. Thus, the panel 12 is secured stably to the frame 14 in the direction of extension of the pins 24 (in the Z direction) by the fastening structure, and in the X and Y directions due to the pins 24 engaging slots $A_1$ through $A_4$. However, upon expansion or contraction of the plastic panel 12 in response to temperature changes in a range of operating temperatures, relative movement of the pins within slots $A_1$ through $A_4$ is permitted along the plane in radial directions toward and away from the center C of the central opening 20. Thus, the panel 12 is free to move in a direction transverse to the extension direction of the pins 24, but only away from or toward the center point C of the central opening 20 upon expansion and contraction thereof, while a stable panel/frame connection is maintained in any direction along the plane between the coextensive peripheral portions of the panel 12 and frame 14 throughout the range of temperature changes.

In the illustrated embodiment, the range of operating temperatures is approximately −40 to 104 degrees Celsius. It can be appreciated that this temperature range is merely one example of an operating temperature range of a particular plastic material. Thus, it is within the contemplation of this invention employ plastic panels capable of operating outside this temperature range.

It can be appreciated that the pin and slot connections at the "B" slots provide stability of the assembly 10 in the Z direction while accommodating inconsistency of expansion of the plastic panel. Thus, since the longitudinal axis of each "B" slot also passes through the common point C, pins in the "B" slots are permitted to move in the slots along the plane toward and away from the point C. Although pin and slot connections are illustrated to provide stability of the assembly in the Z direction, any configuration may be employed which provides stability to the assembly 10 in the Z direction while permitting some relative movement of the panel 12 with respect to the frame in at least one other direction. Thus, for example, it is within the contemplation of the invention to use U-shaped clips instead of the pin and B-slot connections.

As shown in FIG. 6, pads 34 are disposed adjacent each pin 24 to provide a bearing surface to the frame 14 opposing the washer 28 on the other side of the frame 14.

To facilitate assembly of the fasteners 30 and washers 28 to the pins, the frame 14 includes cut-outs 36 therein as shown in FIG. 4 providing access to the pins.

Figure 7:
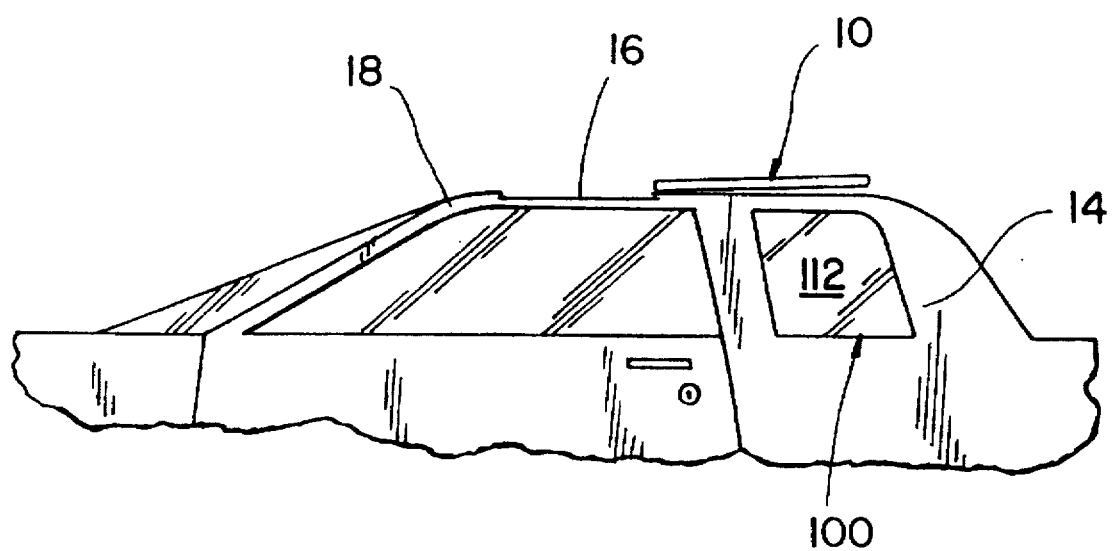
FIG. 7 is a side view of a vehicle employing the plastic panel assembly of the invention in a sunroof assembly and as a side window.

As noted above, the plastic panel assembly 10 of the invention can be utilized in other vehicle applications, such as vehicle windows. Thus, it is within the contemplation of the invention to provide a plastic panel assembly for use as a fixed vehicle window such as the vehicle rear window or immovable side windows. The assembly may include the sheet metal frame 14 of FIG. 2, which can be coupled to the vehicle or, the sheet metal frame 14 may be made integral with the vehicle frame. FIG. 7 shows the assembly 100 employed in a side window, including a plastic panel 112 mounted to the vehicle frame 114, with the pins of the panel 112 secured to the slots of the frame 114 by the fastening structure, in the manner discussed above.

In certain circumstances, particularly when the assembly is employed as a vehicle window, it is preferable that the assembly be covered around its entire periphery to contain the attachment between the plastic panel and frame thereby providing peripheral stability to the assembly.

It can be appreciated that the plastic panel may be coated with a protective coating or covering to reduce or prevent surface scratches therein.

It thus will be seen that the objects of this invention have been fully and effectively accomplished. It will be realized, however, that the foregoing preferred embodiment has been shown and described for the purpose of this invention and is subject to change without departure from such principles. For example, although the illustrated embodiment shows the pins 24 extending from the surface 26 of the plastic panel 12 and the frame 14 includes the slots 22 therein, it can be appreciated that the pins 24 could be coupled to or made integral with the frame 14, while the plastic panel integrates the slots 22. Further, it can be appreciated that all pins need not be on the other mating part. Alternatively, the panel 12 could include both pins and slots which cooperate with pins and slots provided in the frame to define the pin and slot connections. In addition, although the pins are disclosed as being cylindrical, any suitably shaped pin can be employed. For example, rectangular cross-sectioned pins can be used in conjunction with slots of generally rectangular configuration. Therefore, this invention includes all modifications encompassed within the spirit and scope of the following claims.

What is claimed is:

1. A plastic panel assembly for use in a vehicle comprising:

a frame structure defining a central opening therein disposed in a plane, a plastic panel structure disposed with respect to said frame structure so that a marginal peripheral portion thereof extending generally in the direction of extent of said plane is coextensive with a marginal peripheral portion of said frame structure and a central portion thereof extends in covering relation with said central opening, said frame structure having a coefficient of thermal expansion less than that of said plastic panel structure, a series of at least three pin and slot connections extending operatively between the coextensive peripheral portions of said structures and disposed in spaced relation therealong for retaining the coextensive peripheral portions of said structures together, each pin and slot connection including a slot formed in one of said structures and a pin secured to another one of said structures and extending transversely through the slot formed in said one structure, each said slot having a longitudinal axis extending in a direction toward a common point, each pin and slot connection being constructed and arranged to prevent relative movement of said pin within said slot along said plane in one direction within which the pin and slot connection is disposed while allowing relative movement of said pin within said slot along said plane generally in directions away from and toward said common point, the plurality of pin and slot connections being constructed and arranged so as to enable the plastic panel structure to expand and contract with respect to said central opening in response to changes in temperature within a range of operating temperatures while providing a stable connection in any direction along said plane between the coextensive peripheral portions of said structures throughout the range of temperature changes.

2. The assembly according to claim 1, wherein said frame structure is a sheet metal frame.

3. The assembly according to claim 2, wherein said sheet metal frame is made integral with a frame of the vehicle.

4. The assembly according to claim 1, wherein said range of operating temperatures is approximately −40 to 104 degrees Celsius.

5. The assembly according to claim 1, wherein each said pin extends from said plastic panel structure and wherein said frame structure includes said slots.

6. The assembly according to claim 5, wherein said pins are formed integrally with said plastic panel structure.

7. The assembly according to claim 5, wherein said pins are generally cylindrical and sized for insertion into said slots, said slots being constructed and arranged to align said plastic panel structure with respect to said frame structure, each said slot of said plurality of slots being constructed and arranged such that a longitudinal axis thereof passes through said common point which is a center point of said central opening to permit movement of said plastic panel structure along said plane in directions toward and away from said center point upon contraction and expansion of said panel structure.

8. The assembly according to claim 1, wherein said plastic panel structure is an amorphous polycarbonate panel.

9. The assembly according to claim 1, wherein each pin and slot connection includes fastening structure, said fastening structure comprising:

a washer having a bore therethrough, said washer being disposed over said pin such that said pin extends through said bore, said washer being constructed and arranged to reduce friction between said plastic panel structure and said frame structure as the plastic panel structure moves relative to the frame structure upon expansion or contraction of the panel structure; and a fastener having a bore therethrough, said fastener being disposed over said pin such that said pin extends through said bore of said fastener thereby sandwiching said washer between the fastener and said frame structure.

10. The assembly according to claim 9, wherein said fastener is constructed and arranged so as to be insertable over said pin in a certain direction and to resist movement with respect to said pin in a direction opposite to said certain direction so as to retain said plastic panel structure from moving with respect to said frame structure in the direction of extension of said pin.

11. The assembly according to claim 10, wherein each said pin is generally cylindrical and each said fastener is generally disc-shaped, each said fastener including barbs constructed and arranged to engage a periphery of said pin to retain said fastener to said pin and thereby retain said plastic panel structure to said frame structure.

* * * * *